United States Patent [19]
Dach et al.

[11] 3,832,934
[45] Sept. 3, 1974

[54] RESILIENT STOP FOR PISTON OR THE LIKE

[75] Inventors: Hansjorg Dach; Karl Heinz Bordowsky; Manfred Bucksch, all of Friedrichshafen, Germany

[73] Assignee: Z F Getriebe Gesellschaft mit beschrankter Haftung, Saarbrucken, Industriegebiet Sud, Germany

[22] Filed: May 15, 1972

[21] Appl. No.: 253,438

[30] Foreign Application Priority Data
May 14, 1971 Germany............................ 2124008

[52] U.S. Cl.............. 92/130, 192/85 AA, 192/89 B
[51] Int. Cl............................................ F01b 31/00
[58] Field of Search.......... 91/369 B, 369 R, 369 A; 92/130; 188/216; 192/85 AA, 89 B, 70.28

[56] References Cited
UNITED STATES PATENTS

| | | | |
|---|---|---|---|
| 1,983,885 | 12/1934 | Spase................. | 192/70.28 |
| 2,485,214 | 10/1949 | Peterson et al.................. | 192/70.28 |
| 2,720,866 | 10/1955 | Maki et al...................... | 192/85 AA |
| 2,806,568 | 9/1957 | Bliss.................................. | 192/89 B |
| 2,996,886 | 8/1961 | Jeffries.................................. | 92/130 |

Primary Examiner—Paul E. Maslousky
Attorney, Agent, or Firm—Karl F. Ross; Herbert Dubno

[57] ABSTRACT

A peripheral groove on a shaft or in a cylinder accommodates part of an annular abutment of generally S-shaped or W-shaped cross-section whose projecting portion forms a seat for a Belleville spring or for a bearing plate engaged by an array of coil springs. The abutment may be a single, deformable ring or a pair of complementary ring segments held together by the Belleville spring or by the bearing plate under pressure of a piston slidably mounted on the shaft or in the cylinder.

6 Claims, 6 Drawing Figures

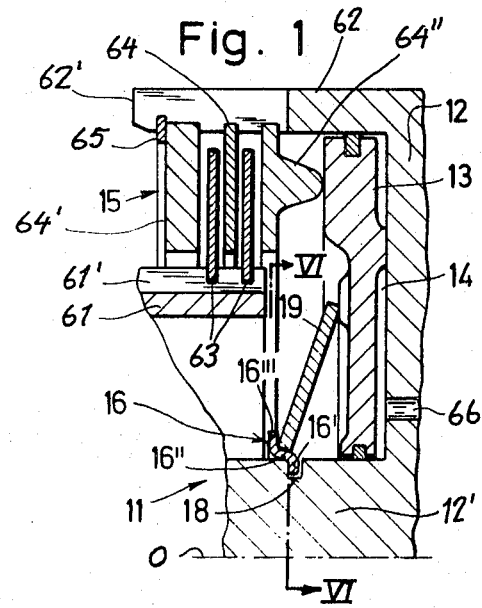
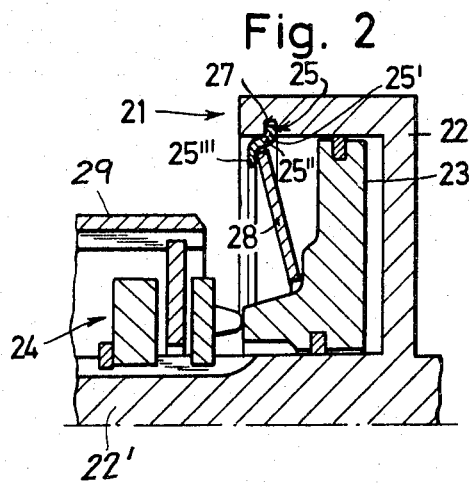
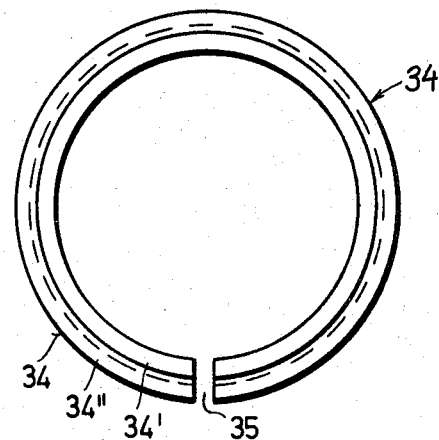
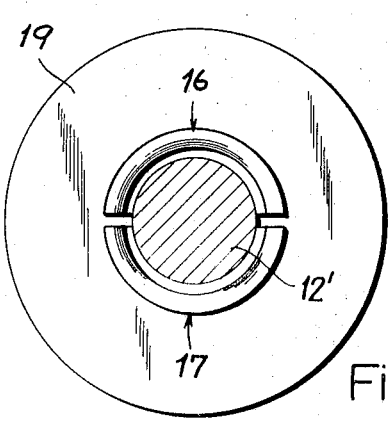
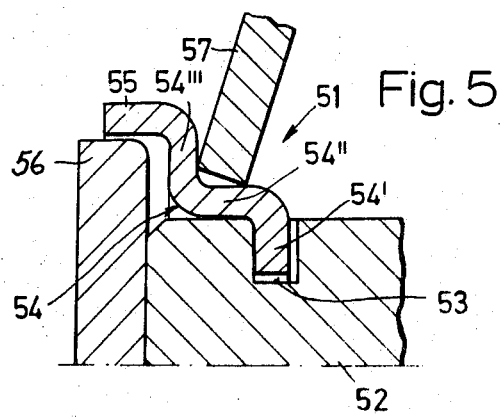

RESILIENT STOP FOR PISTON OR THE LIKE

Our present invention relates to a spring mounting for stopping the motion of a slider, such as a piston, propelled by fluid pressure, gravity or some other force along a cylindrical guide surface formed by, for example, a shaft or a surrounding shell.

Generally, such a stop is conventionally constituted by an annular flange or collar anchored to the guide surface by means of a removable detent such as a split ring snapped into a groove on that surface. Such an arrangement, designed to facilitate disassembly of the slider from its shaft or housing after removal of the abutment and its retaining ring, is relatively complex since it requires the separate emplacement of two coacting members whose juxtaposition, moreover, necessitates a considerable lengthening of the guide surface in its axial direction.

The general object of our present invention is to provide improved stop means avoiding the aforestated drawbacks.

A more particular object is to provide a resilient stop limiting the advance of a hydraulically or pneumatically actuated piston in a clutch or brake unit of the type conventionally used with planetary-gear trains of automotive transmissions.

These objects are realized, pursuant to our present invention, by the provision of an annular abutment of angled, generally S-shaped or W-shaped cross-section having a generally radially extending first leg received in a peripheral groove on its guide surface and a generally radially extending second leg projecting from that surface, these legs being interconnected by a generally axially extending intermediate portion forming with the projecting second leg an annular seat next to the guide surface; the seat is engaged by a resilient pressure element, e.g., a Belleville spring or an array of peripherally spaced coil springs on an annular bearing member such as a spider or a solid plate, extending toward the slider an contacting same at a location axially spaced from the abutment.

To facilitate its engagement in the peripheral groove, the annular abutment is preferably designed as a split ring or as a set of complementary ring segments; thus, the abutment has one or more peripheral discontinuities, yet its closely interfitting engagement with the associated pressure element prevents any spontaneous detachment of the ring or ring segments from the guide surface as long as any pressure is exerted upon the spring or springs. Disassembly, on the other hand, merely requires an additional axial compression of the pressure element to disengage same from the abutment which thereupon can be readily extracted from its groove.

The above and other features of our invention will be described in detail hereinafter with reference to the accompanying drawing in which:

FIG. 1 is a fragmentary axial sectional view of a cylinder and piston provided with a resilient stop according to the present improvement;

FIGS. 2 and 3 are views similar to FIG. 1, showing two other embodiments;

FIG. 4 is a face view of an abutment included in the embodiment of FIG. 3;

FIG. 5 is a cross-sectional detail view of a modification of the abutment shown in FIGS. 3 and 4, drawn to a larger scale; and FIG. 6 is a cross-sectional view taken on the line VI — VI of FIG. 1.

In FIG. 1 we have shown part of a pneumatic or hydraulic actuator having a coupling 15 between two coaxial sleeves 61 and 62, e.g., as described in our co-pending application Ser. No. 253,440, now U.S. Pat. No. 3,747,727, of even date. This coupling comprises a set of interleaved annular friction elements 63, 64 which are slidably guided on ribs 61' of sleeve 61 and on fins 62' of sleeve 62, respectively, the stack of friction members 63, 64 being sandwiched between two rings 64', 64" also guided by the fins 62'. A snap ring 65, accommodated in cutouts of fins 62', serves as an end stop for the stack whose members may be axially compressed by a piston 13 in a cylinder 12 integral with sleeve 62; pressure fluid is admitted into a space 14 of the cylinder via a port 66 by a manually operable controller (not shown). Depending on whether housing 12 is rotatable or stationary, coupling 15 acts as a clutch or as a brake for a shaft integral with sleeve 61. The advance of piston 13 is resisted by a Belleville spring 19 surrounding a hub 12' of cylinder 12; this hub forms a cylindrical guide surface for the shaft 13 and is provided with a peripheral groove 18 axially spaced from the piston 13 in any of its operating positions.

A resilient stop 11 for piston 13 includes, besides the spring 19, an annular abutment consisting of two semicircular ring segments 16 and 17 as illustrated in FIG. 6; each segment has a generally S-shaped cross-section with a first leg 16' inserted in groove 18, an intermediate or transition portion 16" generally parallel to the cylinder axis 0 and a second leg 16''' projecting from the cylindrical surface of hub 12'. The two profile portions 16" and 16''' form a seat for the inner periphery of Belleville spring 19 which holds the ring segments 16, 17 in engagement with groove 18 inasmuch as spring 19 is prevented by the piston 13 from leaving its seat. It will be apparent that, upon a partial flattening of spring 19 in the retracted piston position, the two ring segments 16 and 17 can be extracted from groove 18; after a disengagement of ring 65 from fins 62', the entire unit can then be axially disassembled.

FIG. 2 shows a cylinder 22 supporting a coupling 24 on a hub 22' thereof, the coupling 24 linking that hub with a stationary or rotatable sleeve 29 to act as a brake or a clutch in the manner described above. A resilient stop 21 for piston 23 comprises an annular abutment 25 of generally S-shaped profile with an outer leg 25' received in a peripheral groove 27 of the cylinder periphery, a generally axially extending intermediate portion 25" and an inwardly projecting leg 25''' forming a seat for a Belleville spring 28. The operation of this assembly is analogous to that described with reference to FIGS. 1 and 6.

In FIG. 3 we have shown a cylinder 32 whose hub 32' has a groove 38 accommodating an inner leg 34' of an annular abutment 34, more fully illustrated in FIG. 4, whose generally S-shaped cross-section also has portions 34", 34''' analogous to those described above. Abutment 34 forms part of a resilient stop 31 for a piston 33, this stop also including a bearing plate 36 supporting an array of peripherally spaced coil springs 39 (only one shown) which act upon the piston 33. The deformable ring 35 has a gap 35 facilitating its mounting on hub 32'; again, as described above, the close interfitting between pressure element 36 and the annular seat 34'', 34''' prevents any unintentional detachment of ring 34 from its supporting surface.

In FIG. 5 we have shown part of a spring mounting 51 which differs from the mountings 11, 21 and 31 of preceding Figures in that its abutment ring 54, whose generally W-shaped profile includes portions 54', 54'' and 54''' analogous to those described above, also has an annular flange 55 which overlies a shoulder 56 adjoining a shaft 52; the latter has a peripheral groove 53 receiving the leg 54'. A pressure member 57, shown again as a Belleville spring, holds the abutment 54 in its illustrated position. Shoulder 56 may form part of a thrust bearing for the shaft 52; its engagement or near-engagement with flange 55 stabilizes the ring 54 against excessive deformation under pressure from spring 57.

It will be apparent that any of the abutments shown in FIGS. 1, 3 and 5 may be constructed either as a unitary split ring (FIG. 4) or as a segmented ring (FIG. 6) and that, if desired, more than two segments may be provided. With suitable dimensioning of its mounting groove, which advantageously is a little wider than the leg to be received therein, rings of different thickness may be interchangeably used according to different operating conditions. The ring can be conveniently manufactured by conventional techniques, including deep-drawing from sheet metal or sinter casting.

We claim:

1. An assembly comprising a supporting member with a cylindrical guide surface; a slider engaging said guide surface for axial displacement therealong under pressure; an annular abutment in the path of said slider, said abutment being of angled cross-section having a generally radially extending first leg received in a peripheral groove of said guide surface and a generally radially extending second leg projecting from said guide surface, said legs being interconnected by a generally axially extending intermediate portion forming with said second leg an annular seat adjacent said guide surface, said abutment having at least one peripheral discontinuity facilitating its insertion into said groove; and resilient means disposed coaxially with said guide surface between said abutment and said slider in contact with said seat, said resilient means being closely interfitted with said seat for holding said first leg in said groove.

2. An assembly as defined in claim 1 wherein said abutment consists of a plurality of complementary ring segments.

3. An assembly as defined in claim 1 wherein said abutment is a split ring.

4. An assembly as defined in claim 1 wherein said resilient means comprises a Belleville spring.

5. An assembly as defined in claim 1 wherein said resilient means comprises an annular bearing member and an array of coil springs peripherally spaced along said bearing member.

6. An assembly as defined in claim 1 wherein said supporting member has an annular shoulder bounding said guide surface beyond said groove, said abutment being provided on said second leg with an annular flange overlying said shoulder.

* * * * *